Dec. 5, 1967   B. KALKNER   3,356,900
SHORT-CIRCUIT CURRENT LIMITER FOR COUPLED POWER SYSTEMS
Filed Jan. 4, 1965

INVENTOR
Bernhard Kalkner
BY Spencer & Kaye
ATTORNEYS

United States Patent Office 3,356,900
Patented Dec. 5, 1967

3,356,900
SHORT-CIRCUIT CURRENT LIMITER FOR COUPLED POWER SYSTEMS
Bernhard Kalkner, Bad Homburg vor der Hohe, Germany, assignor to Licentia Patent-Verwaltungs-G.m.b.H., Frankfurt am Main, Germany
Filed Jan. 4, 1965, Ser. No. 422,977
Claims priority, application Germany, Jan. 4, 1964, L 46,719
8 Claims. (Cl. 317—20)

The present invention relates to a circuit arrangement for limiting overload currents.

Modern electric power distribution systems incorporate a number of basically independent systems which, however, are connected to each other so as to form an exceedingly complex over-all power distribution circuit. As the number of current mains which form part of the over-all system increases, so does the overload current which may flow in the event of faults, and it has been found that the overload currents which can result exceed those which have heretofore been experienced in individual distribution systems of less complexity. Thus, such overload circuit berakers and switches which are fully satisfactory in smaller distribution systems are, if incorporated in a complex system, often overloaded to such an extent that they sometimes can not interrupt the circuit at all, or only after a larger number of half waves. Furthermore, the components of the distribution system are, as a result of the unexpectedly high short-circuit currents, subjected to very large dynamic forces. This, in turn, can damage transformers, burn out conductors and disrupt switching stations.

The fact that it is not only the thermal effects of the short-circuit currents which may cause damage but also the dynamic effect may produce damage and still further faults, makes it necessary to approach the electric circuit protection problem from a basically different point of view. That is to say, even if new high-power circuit breakers are provided which could handle the short-circuit currents, the smaller distribution system is only partly protected, and even then, experience has shown that high-performance circuit breakers can not completely ward off the effects of the dynamic forces produced by the short-circuit currents. The only way of effectively protecting the systems against such dynamic forces is to limit the current immediately, that is to say, if already the first half wave of the overload current is interrupted. Only then will the smaller distribution net be protected from the dynamic effects, and the switches incorporated in such smaller circuits will no longer be exposed to excessive loads and can, therefore, take care of interrupting their respective circuits during the normal interval. In this way, the short circuit can be interrupted during the normal interval. Furthermore, the various power houses connected to the distribution system will then no longer be able to send short-circuit currents into the short circuit of the faulted distribution network, and, once the local short circuit has been interrupted, are once more ready for normal operation. It will be appreciated that if the current is limited during the time while the fault prevails, the normal operation can resume in a very much shorter time, and the distribution networks will not nearly as easily be disturbed, as would be the case but for the special steps taken.

Various attempts have been made to overcome the above drawbacks, as, for example, by connecting into the connecting line between the two nets a choke which is magnetically supersaturated at normal operation and which, when a given maximum current is reached, serves to limit the current and, after the current has dropped, once again establishes a good connection between the nets. Not only is such an arrangement expensive, but it has the additional disadvantage that the supersaturated choke, in normal operation, still has a relatively large stray voltage so that it acts as an interfering voltage drop. The same applies to air core short-circuit chokes.

It is, therefore, the primary object of the present invention to avoid these damages and to obtain the advantages described above, and, with this object in view, the present invention resides in a circuit arrangement for limiting overload currents in high power high-tension alternating current distribution nets, particularly at the point where individual distribution nets are coupled to each other. In accordance with the present invention, the circuit comprises a series connection of two reactances which have different algebraic signs, i.e., inductive and capacitative reactances, and which, in normal operation, have approximately the same impedance, at least one of these reactances having such a dependency on the current as to effect, above a permissible limit current, a marked change in the resulting total reactance and therefore a limiting of the current.

In the simplest case, the series circuit is constituted by a capacitor and a closed core non-saturated choke coil, this series circuit being incorporated into the connecting line, the resonant frequency of the series resonant circuit being approximately tuned to the net frequency, the choke being so arranged that at a given value, which is to be considered the limit or cut-off value, the overload current will saturate the iron core to such an extent that the resonant frequency moves away substantially from the frequency of the net.

During normal operation, this resonant circuit represents a very small impedance inasmuch as its resonant frequency is substantially equal to the net frequency. If, however, the short-circuit current becomes excessively high, the iron core is saturated whereupon the resonant circuit will be detuned to such an extent, i.e., its inherent resonant frequency moves away from the net frequency to such an extent, that when there is an overload current the resonant circuit will represent a high impedance.

More particularly, the present invention resides in an arrangement for limiting the overload currents in a line between two alternating current nets which normally operate at a given frequency, which arrangement comprises a series circuit of inductive reactance means and capacitative reactance means which, during normal operation, have approximately the same value thereby to offer substantially no impedance to a current through the line. In accordance with the present invention, it is the inductive reactance which has a non-linear current dependency. More particularly, the inductive reactance comprises a coil and a saturable iron core which, when the current through the line goes above the predetermined current value, is saturated thereby to become a means for rendering the resonant frequency of the series-circuit substantially different from the given frequency at which the nets normally operate. In this way, the series-circuit is detuned, so that the resulting total impedance is substantially increased, which, in turn, effectively limits the current through the line.

Additional objects and advantages of the present invention will become apparent upon consideration of the following description when taken in conjunction with the accompanying drawings in which.

Figure 1:
FIGURE 1 is a circuit diagram of one embodiment of the present invention.

Referring now to the drawings and first to FIGURE 1 thereof, the same shows two current distribution nets I and II which are connected to each other via a series circuit incorporating a capacitor C and a closed core choke coil representing an inductance L. In practice, the winding of the coil L is such that it will be as low-ohmic as possible.

According to the present invention, the capacitative reactance $X_C$ produced by the capacitor C and the inductive reactance $X_L$ produced by the choke coil L will be such that the resonant frequency of the circuit is approximately equal to the frequency of the current distribution systems, so that the resonant circuit will represent a very low impedance. However, when a short-circuit current flows through the circuit, the iron core of the inductance will be saturated, whereupon the inductive reactance of the coil and hence the resonant frequency of the circuit changes to such an extent as to be materially different from the frequency of the distribution nets, so that the series circuit then represents a high impedance.

It will be appreciated that FIGURE 1 shows but a single phase; in practice, similar circuit components will be provided in each of the phases.

Figure 2:
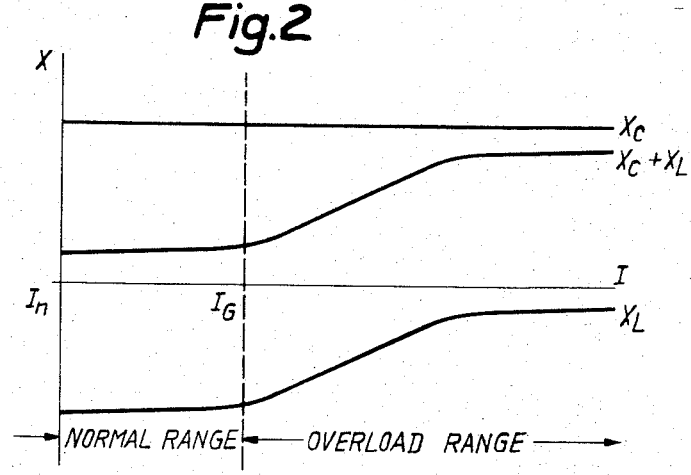
FIGURE 2 is a graph showing the reactance of the capacitative and inductive reactances as well as the total reactance of the series circuit as a function of the current through the series circuit.

FIGURE 2 shows the operation of the present invention, the same being a plot of the inductive and capacitative reactances $X_L$ and $X_C$, as a function of the current I. FIGURE 2 also shows the total reactance $X_C+X_L$ of the series circuit. FIGURE 2 shows the behavior of the circuit during the normal operating region, as well as the region of short-circuit operation. $I_g$ represents the cut-off current at which the total impedance of the series circuit commences to rise appreciably.

Figure 3:
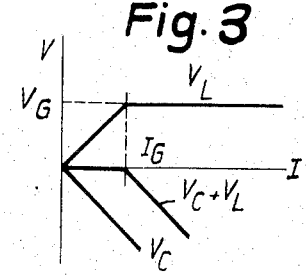
FIGURE 3 is a graph showing the voltage as a function of the current.

As stated above, a supersaturated choke alone will not make it possible to limit the current in a desired manner, because just at the point at which the saturation begins the inductive resistance drops appreciably. On the other hand, depending upon the exact design of the choke coil, the inductive reactance is in general not yet so large as would be required in order to limit the current in a manner required. The change of the reactance does not occur with the proper algebraic sign, and the relative change does not result unless, in accordance with the present invention, there is provided the resonant circuit described above. The resulting impedance is composed of the sum of the constant reactance $X_C$ of the capacitor and the curve $X_L$ representing the reactance of the choke coil. This sum is small and practically constant within the range limited by the normal current $I_n$ and the cut-off current $I_g$, that is to say, until the choke begins to be saturated. But, when the choke does become saturated, the impedance of the resonant circuit becomes a multiple of its original value, so that, in case of faults, the current is readily limited, as shown in FIGURE 3, where $V_C$ shows the linear voltage drop across the capacitor while $V_L$ represents the current-voltage characteristics of the choke coil. This characteristic and with it the voltage $V_A$ increases linearly to $I_g$, after which it remains substantially constant. The curve $V_C+V_L$ is the characteristic of the series-resonant circuit as it appears across terminals of the transformer. Since the two reactances are to be in resonance, the resulting impedance and hence the voltage drop appearing thereacross, to the limit value $I_g$ or $V_g$, which is when the core of the coil begins to saturated, is practically equal to 0. From this point on, the characteristic follows that of the capacitative reactance.

Figure 4:
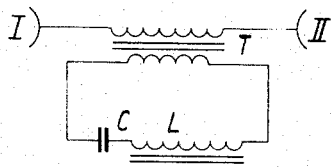
FIGURE 4 is a circuit diagram of still another embodiment of the present invention.

FIGURE 4 shows the elemental case of a resonant circuit which is tuned to 60 c.p.s., the circuit comprising the capacitors C and the closed core choke coil L which is connected, via a transformer T, between the two current mains I and II. The closed core choke coil here is so dimensioned that the iron core becomes saturated at a predetermined overload current and the choke coil as the result abruptly changes its impedance. This upsets the resonance and, instead of an impedance equal to 0 such as prevailed during normal operation, there now appears across the terminals of the capacitor a capacitative reactance.

If the two nets I and II are to be coupled to each other in such a manner that each may draw heavily on the other, that is to say, if the cut-off current is to be a multiple of the rated current, the use of a common transformer can bring with it a number of particular advantages.

Shunt resistances or shunt reactances, which can take over a substantial portion of the total current so as to make it unnecessary to design the resonant circuit excessively large, can now be connected to the secondary and are neither in potential nor structurally connected to the transmission line. Inasmuch as shunt currents will flow only under fault conditions, no special provision is needed to handle particularly high currents.

Figure 5:
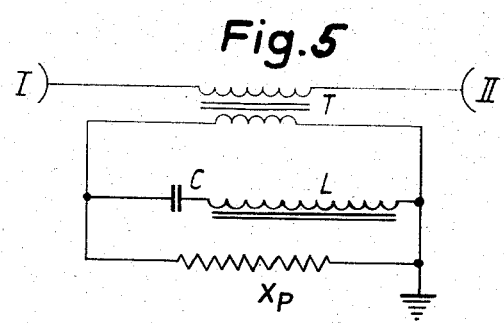
FIGURE 5 is a circuit diagram of still a further embodiment of the present invention.

Such an arrangement is shown in FIGURE 5, where $X_p$ represents, for example, the ohmic or inductive parallel impedance which draws a current under fault conditions. This resistance can, for example, be constituted by a grounded water resistance.

As is shown for one phase in the various figures, the use of a transformer allows the connecting leads of the various limiting circuits, for all phases, to be grounded directly.

One particular advantage of the present invention is that the short time interval during which the short-circuit is interrupted is not dependent on the reaction time of any electromechanical or electronic switching element. Instead, the overload current itself, as it comes into being, produces its own limitation so that the current will reliably be prevented from exceeding a predetermined maximum. Besides the fact that the arrangement is fully self-acting and without inherent reaction time, it has been found that the circuit is trouble-free as well as invulnerable to any adverse effect of overloads.

Another advantage of the present invention is that the two circuits themselves need not be disconnected from each other, that is to say, it is not necessary that the two circuits be actually disconnected from each other. Instead, the electrical circuit which is interposed between the two nets remains connected to the two nets at all times. This has the marked advantage that, after a fault has been eliminated and the voltage across the junction of the two nets once again drops to zero, the circuit will once again be resonant for the normal operating frequency of the two circuits so that the circuit is returned to its original state. This means that after the fault has been eliminated, the circuit automatically re-establishes the original connection and is able to function once more in case of a renewed fault.

In practice, undesired and interferring changes of the resonant circuits during operation are avoided by not tuning the resonant circuits precisely to the net frequency, but to tune the circuits so that, during normal operation, it is slightly in the capacitative region.

It will be seen that the resonant tuning of the two reactances causes large voltages to appear across the respective reactances even during the normal operation, which voltages increase even further in the case of overload and may for at least one of the two components reach twice the value of the line voltage. It is to avoid this that the reactances are connected between the two nets by means of a transformer, as shown in FIGURES 3, 4, and 5, these components being connected not singly but in series with the secondary of a common transformer whose primary winding lies in the connection between the two nets. This transformer need not be designed to withstand twice the line voltage, but it suffices if it is designed to withstand only the line voltage insofar as flux and insulation is concerned, and even this voltage appears only when there is a complete short-circuit in one of the two nets while, during normal operation, only the very small residual voltage of the series resonant circuit appears across the transformer. Thus, the transformer is, for all practical purposes, short-circuited and has to be designed as a current transformer for the respective currents in the primary and secondary. Thus, the induction in the iron is very low during normal operation, and the iron losses which appear during such normal operation are minimal. The core induction lies sufficiently below the saturation so that in the event of sudden changes in the circuit, there will be no saturation effects which might otherwise delay, or interfere with, the action described.

The use of the common transformer also makes it possible, by changing the transformer ratio, to vary the limit values for the permissible current in case of overload. Thus, in accordance with the present invention, the overload current can be kept within tolerable limits even when the system falls out of step and during transient phase opposition, this being done by low values of the transformer induction. Thus, the circuits will not be disconnected and separated from each other so that after the system has once again assumed its synchronism and in-phase relationship, the connection is once again established.

If, for any reasons, such as those relating to problems incident to insulation, economics or others, only one of the two reactances may be connected to the line between the two nets by means of a transformer, the basic operation of the present invention will not be affected.

It will be understood that the above description of the present invention is susceptible to various modifications, changes, and adaptations, and the same are intended to be comprehended within the meaning and range of equivalents of the appended claims.

What is claimed is:

1. An arrangement for limiting overload currents in a line between two alternating current nets which normally operate at a given frequency, said arrangement comprising a series-circuit of inductive reactance means and capacitative reactance means which, during normal operation, have approximately the same value thereby to offer substantially no impedance to a current through said line, said inductive reactance means comprising a coil and a saturatable iron core which, when the current through said line goes above a predetermined value, is saturated thereby to become a means for rendering the resonant frequency of said series-circuit substantially different from said given frequency and hence for detuning said series-circuit, whereby the resulting total impedance is substantially incurred, thereby effectively to limit the current through said line.

2. An arrangement as defined in claim 1 wherein said series-circuit is tuned to appear slightly capacitative during normal operation, thereby to avoid jumps upon the attainment of overload conditions.

3. An arrangement as defined in claim 1 wherein said series-circuit is connected to said line via a transformer whose primary is in said line and across whose secondary said series-circuit is connected.

4. An arrangement as defined in claim 3 further comprising impedance means connected in parallel with said series-circuit.

5. An arrangement as defined in claim 4 wherein said impedance means are ohmic.

6. An arrangement as defined in claim 4 wherein said impedance means are inductive.

7. An arrangement as defined in claim 4 wherein said impedance means comprise a grounded water resistance.

8. An arrangement as defined in claim 3 wherein said transformer is an adjustable transformer.

References Cited

UNITED STATES PATENTS

| 1,344,713 | 6/1920 | Peters | 317—20 X |
| 1,755,111 | 4/1930 | Gay | 317—20 X |
| 3,152,282 | 10/1964 | Baltensperger et al. | 317—11 |

MILTON O. HIRSHFIELD, *Primary Examiner.*

R. V. LUPO, *Assistant Examiner.*

UNITED STATES PATENT OFFICE
CERTIFICATE OF CORRECTION

Patent No. 3,356,900                      December 5, 1967

Bernhard Kalkner

It is hereby certified that error appears in the above numbered patent requiring correction and that the said Letters Patent should read as corrected below.

Column 1, line 23, for "berakers" read -- breakers --; column 2, line 25, for "reasonant" read -- resonant --; column 4, line 57, for "interferring" read -- interfering --; line 69, strike out "3,"; column 6, line 11, for "incurred" read -- increased --.

Signed and sealed this 18th day of March 1969.

(SEAL)

Attest:

Edward M. Fletcher, Jr.                          EDWARD J. BRENNER

Attesting Officer                                Commissioner of Patents